(12) United States Patent
Nagao et al.

(10) Patent No.: US 10,452,355 B2
(45) Date of Patent: Oct. 22, 2019

(54) AUTOMATON DEFORMING DEVICE, AUTOMATON DEFORMING METHOD, AND COMPUTER PROGRAM PRODUCT

(71) Applicant: KABUSHIKI KAISHA TOSHIBA, Minato-ku, Tokyo (JP)

(72) Inventors: Manabu Nagao, Kawasaki Kanagawa (JP); Takashi Masuko, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 811 days.

(21) Appl. No.: 14/826,398

(22) Filed: Aug. 14, 2015

(65) Prior Publication Data
US 2016/0086096 A1    Mar. 24, 2016

(30) Foreign Application Priority Data

Sep. 18, 2014 (JP) .................................. 2014-190377

(51) Int. Cl.
*G06F 7/483* (2006.01)
*G05B 19/045* (2006.01)

(52) U.S. Cl.
CPC ........... *G06F 7/483* (2013.01); *G05B 19/045* (2013.01); *G05B 2219/23288* (2013.01)

(58) Field of Classification Search
CPC ........ G06F 7/483; G06F 9/444; G06F 9/4498; G05B 19/045; G05B 2219/23288;
(Continued)

(56) References Cited

U.S. PATENT DOCUMENTS 6,266,634 B1 *   7/2001   Buchsbaum ............ G10L 15/08
                                                           704/232
6,587,844 B1 *   7/2003   Mohri ................... G10L 15/083
                                                           704/256
(Continued)

FOREIGN PATENT DOCUMENTS

JP    2005-215672    8/2005
JP    2006-031403    2/2006
(Continued)

OTHER PUBLICATIONS

Diamantino Caseiro. "WFST Compression for Automatic Speech Recondition", Interspeech 2010, Sep. 2010, Makuhari, Chiba, Japan.
(Continued)

*Primary Examiner* — Dave Misir
(74) *Attorney, Agent, or Firm* — Amin, Turocy & Watson LLP

(57) ABSTRACT

According to an embodiment, an automaton deforming device includes a transforming unit and a deforming unit. The transforming unit generates second values by transforming first values, which either represent weights assigned to transitions in a weighted finite state automaton or represent values that are transformed into weights assigned to transitions in a weighted finite state automaton, in such a way that number of elements of a set of the first values are reduced and an order of the first values is preserved. The deforming unit deforms a weighted finite state automaton in which weights according to the second values are assigned to transitions.

18 Claims, 6 Drawing Sheets

(58) Field of Classification Search
CPC ........... G05B 2219/23289; G05B 2219/23284;
G05B 2219/23285; G05B 2219/23286;
G10L 15/193; G06N 99/005; G06N 7/005
USPC .......................................................... 706/14
See application file for complete search history.

(56) References Cited

U.S. PATENT DOCUMENTS

| | | | |
|---|---|---|---|
| 7,711,561 | B2 | 5/2010 | Hogenhout et al. |
| 7,895,040 | B2 | 2/2011 | Sakai et al. |
| 8,275,730 | B2 | 9/2012 | Nagao |
| 8,290,774 | B1* | 10/2012 | Mohri .................... G06N 5/003 704/257 |
| 8,311,825 | B2 | 11/2012 | Chen |
| 8,725,730 | B2 | 5/2014 | Keeton et al. |
| 8,744,836 | B2 | 6/2014 | Nagao |
| 8,943,006 | B2 | 1/2015 | Nagao |
| 2012/0046939 | A1* | 2/2012 | Mohri ................. G06F 17/2775 704/9 |
| 2013/0073503 | A1* | 3/2013 | Nagao ................... G10L 15/083 706/45 |
| 2013/0073564 | A1* | 3/2013 | Nagao ................. G06F 17/2775 707/748 |
| 2013/0179158 | A1 | 7/2013 | Nakamura et al. |
| 2015/0178285 | A1 | 6/2015 | Nagao |
| 2015/0179166 | A1 | 6/2015 | Nagao |
| 2015/0179177 | A1 | 6/2015 | Nagao |
| 2015/0220074 | A1 | 8/2015 | Nagao |

FOREIGN PATENT DOCUMENTS

| | | |
|---|---|---|
| JP | 2006-84942 | 3/2006 |
| JP | 2008-015120 | 1/2008 |
| JP | 2009-058989 | 3/2009 |
| JP | 4241771 | 3/2009 |
| JP | 4243777 | 3/2009 |
| JP | 4322815 | 9/2009 |
| JP | 2010-079723 | 4/2010 |
| JP | 2010-237806 | 10/2010 |
| JP | 2011-198126 | 10/2011 |
| JP | 4956334 | 6/2012 |
| JP | 4977163 | 7/2012 |
| JP | 5121650 | 1/2013 |
| JP | 2013-065188 | 4/2013 |
| JP | 2013-164572 | 8/2013 |
| JP | 2015-121707 | 7/2015 |
| JP | 2015-121708 | 7/2015 |
| JP | 2015-121709 | 7/2015 |
| JP | 2015-143800 | 8/2015 |

OTHER PUBLICATIONS

M. Droste, et al. Handbook of Weighted Automata, Monographs in Theoretical Computer Science; Chapter 6: Weighted Automata Algorithms (Mehryar Mohri), An EATCS Series, 2009, ISBN 978-3-642-01491, pp. 213-254.

"OpenFst Version 1.4.1" 1.4.1 src/include/fst/minimize.h:530; retrieved from the Internet at http://www.openfst.org/twiki/pub/FST/FstDownload/openfst-1.4.1.tar.gz.

Jeffrey R. Johnston, et al. "A High-Rate, Low-Power, ASIC Speech Decoder Using Finite State Transducers", IEEE 23rd International Conference on Application-Specific Systems, Architectures and Processors, IEEE Computer Society, 2012, pp. 77-85.

E. W. D. Whittaker, et al. "Quantization-based Language Model Compression", Eurospeech 2001, Scandinavia, pages.

I. Lee. Hetherington. "PocketSUMMIT: Small-Footprint Continuous Speech Recognition", Interspeech 2007, Aug. 2007, Antwerp, Belgium, pp. 1465-1468.

Paul R. Dixon, et al.. "Exploring Web-Browser based Runtimes Engines for Creating Ubiquitous Speech Interfaces", Interspeech 2010, Sep. 2010, Makuhari, Chiba, Japan, pp. 630-632.

Ken-Ichi Iso, et al. "Improvements in Japanese Voice Search", Interspeech 2012.

Ken-Ichi Iso, et al. "Development of speech recognition and natural language processing for ONSEI Assist service", IPSJ SIG Technical Report, vol. 2013-SLP-98, No. 4, pp. 1-6, 2013, Only English Abstract Considered.

* cited by examiner

AUTOMATON DEFORMING DEVICE, AUTOMATON DEFORMING METHOD, AND COMPUTER PROGRAM PRODUCT

CROSS-REFERENCE TO RELATED APPLICATIONS

This application is based upon and claims the benefit of priority from Japanese Patent Application No. 2014-190377, filed on Sep. 18, 2014; the entire contents of which are incorporated herein by reference.

FIELD

Embodiments described herein relate generally to an automaton deforming device, an automaton deforming method, and a computer program product.

BACKGROUND

A finite state automaton (FSA) is used in various fields such as natural language processing and pattern recognition. For example, the applications of an FSA include searching for specific character strings in a text or searching for patterns of character strings in a text. Meanwhile, a finite state automaton is sometimes also called a finite automaton (FA) or a finite state machine (FSM). In the following explanation, symbols assigned to the transitions in an FSA are called input symbols. Generally, an input symbol is simply called a symbol. Moreover, an input symbol is sometimes also called an alphabet or a character.

An FSA in which the weights are taken into account is called a weighted finite state acceptor. An FSA in which the weights as well as the output symbols are taken into account is called a weighted finite state transducer (WFST). In the following explanation, a weighted finite state acceptor and a weighted finite state transducer (WFST) are collectively called a weighted finite state automaton (WFSA). Moreover, a model obtained by adding more functions to a weighted finite state acceptor or a weighted finite state transducer (WFST) is also assumed to be included in the WFSA as a derived model. Such a WFSA is used in expressing a dictionary or a model required in speech recognition, handwritten-character recognition, or optical character recognition (OCR), or is used in statistical machine translation.

A WFSA that is obtained by transformation from a dictionary of a model may not have the structure suitable for use in pattern recognition. For that reason, there are times when a deformation operation is performed. For example, a technology is known in which, after a deformation operation is performed on a WFSA, the weights are quantized with the aim of reducing the size of the memory area required in storing the WFSA.

However, in the conventional technology, since quantization of the weights is performed after the deformation operation, there are times when unnecessary paths generated during quantization of the weights cannot be eliminated.

DETAILED DESCRIPTION

According to an embodiment, an automaton deforming device includes a transforming unit and a deforming unit. The transforming unit generates second values by transforming first values, which either represent weights assigned to transitions in a weighted finite state automaton or represent values that are transformed into weights assigned to transitions in a weighted finite state automaton, in such a way that number of elements of a set of the first values are reduced and an order of the first values is preserved. The deforming unit deforms a weighted finite state automaton in which weights according to the second values are assigned to transitions.

Preferred embodiments of an automaton deforming device are described below in detail with reference to the accompanying drawings.

First Embodiment

In an automaton deforming device according to a first embodiment, prior to performing a deformation operation on a WFSA, transformation of weights is performed in such a way that a greater number of unnecessary paths would be removed during the deformation operation. As a result, a WFSA can be obtained in which the number of transitions is smaller than in the conventional case.

Figure 1:
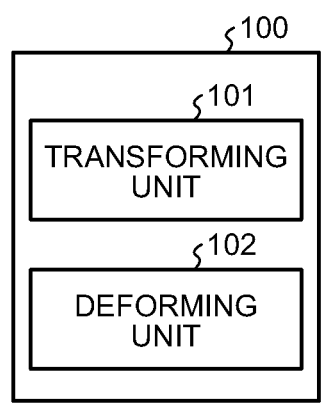
FIG. 1 is block diagram illustrating an automaton deforming device according to a first embodiment.

FIG. 1 is block diagram illustrating an exemplary configuration of an automaton deforming device 100 according to the first embodiment. As illustrated in FIG. 1, the automaton deforming device 100 includes a transforming unit 101 and a deforming unit 102.

The transforming unit 101 transforms, prior to a deformation operation, the weights (an example of first values) assigned to the transitions in a WFSA. Herein, the transforming unit 101 transforms the weights in such a way that the set of weights has a decreased number of elements and the order of weights is preserved, and generates post-transformation weights (an example of second values).

The deforming unit 102 deforms the WFSA in which the post-transformation weights are assigned to the transitions. The deformation operation performed by the deforming unit 102 may include any of the conventional deformation operations such as a determinization operation, a pushing operation, a minimization operation, an ε-removal operation, and a composing operation.

Meanwhile, the transforming unit 101 and the deforming unit 102 can be implemented, for example, by executing computer programs in a processor such as a central processing unit (CPU), that is, can be implemented using software; or can be implemented using hardware such as an integrated circuit (IC); or can be implemented using a combination of software and hardware.

Figure 2:
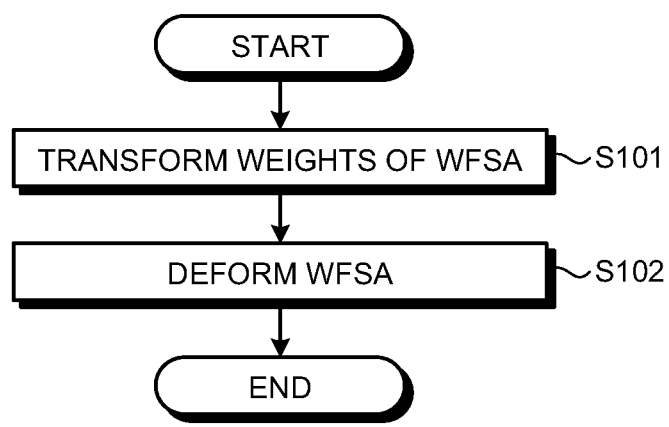
FIG. 2 is a flowchart for explaining an automaton deformation operation according to the first embodiment.

Explained below with reference to FIG. 2 is an automaton deformation operation performed in the automaton deforming device 100 configured in the manner described above according to the first embodiment. FIG. 2 is a flowchart for explaining an example of the automaton deformation operation according to the first embodiment.

The transforming unit 101 transforms the weights of a WFSA (Step S101). Herein, the transforming unit 101 transforms the weights of a WFSA in such a way that the paths having the same weight increase in number. In other words, if V represents the set (that is "ordered set") of weights assigned to the transitions, the transforming unit 101 performs weight transformation in such a way that there is a decrease in the number of elements of the set V and the order of weights is maintained (preserved). The order of weights can be said to be preserved in the following example. Assume that V' represents the set of post-transformation weights, and f represents mapping from the set V to the set V'. In that case, with respect to arbitrary elements x and y of the set V, if holds true, then f(x)≤f(y) also holds true.

Subsequently, the deforming unit 102 deforms the WFSA in which the weights have been transformed (Step S102). As described above, the deformation operation performed by the deforming unit 102 may include a determinization operation, a pushing operation, a minimization operation, an ε-removal operation, and a composing operation.

Given below is the explanation of an example of the transformation operation performed by the transforming unit 101 at Step S101. The transforming unit 101 performs weight transformation according to any one of a first transformation operation to a fifth transformation operation described below or according to a plurality of combinations of those transformation operations.

First Transformation Operation

On a floating-point number, the transforming unit 101 performs rounding down, rounding up, and rounding off so that the number in the floating-point format is transformed into a number in the integer format. From among the transitions assigned with weights, if two or more transitions are assigned with weights having different numbers after the decimal point, the first transformation operation results in a decrease in the number of elements in the set V. If V={1, 1.2, 2.1} holds true, rounding down after the decimal point results in the formation of a set V'{1, 2} of post-transformation weights. Thus, it can be understood that the number of elements decreases. Moreover, "1" and "1.2" are transformed into "1"; and "2.1" is transformed into "2". Thus, it can be understood that the order of weights is also preserved.

Second Transformation Operation

The transforming unit 101 transforms a floating-point number (a number in the floating-point format) into a fixed-point number (a number in the fixed-point format). Since a fixed-point number has a limited number of decimal places, values smaller than the retainable number of decimal places are subjected to rounding down, rounding up, and rounding off in an identical manner to integerization.

Third Transformation Operation

The transforming unit 101 reduces the number of bits of the memory area used in holding a single weight. That is, the transforming unit 101 transforms the weights in such a way that the number of bits expressing the post-transformation weights is smaller than the number of bits expressing the pre-transformation weights. Exemplary methods for reducing the number of bits of the memory area are explained below.

One of the methods is to transform the weights that are expressed in the double-precision floating point format into weights expressed in the single-precision floating point format. As a result of such transformation, there is a decrease in the number of significant figures. Hence, regarding two weights that are slightly different in the double-precision floating point format but are same in the single-precision floating point format; if at least one of those two weights is assigned to any of the transitions, the number of elements of the set V decreases.

In the second method, when the weights of all transitions are integers, the number of bits required in holding the weights is reduced. When a pre-transformation weight that is expressed as an x-bit integer is to be reduced to a y-bit integer, the x-bit integer is divided by 2 raised to the power of (x-y) followed by rounding down, rounding up, and rounding off after the decimal point. Regarding the weights that are different only in the lower (x-y) number of bits; if at least one of those weights is assigned to any of the transitions, the number of elements of the set V decreases.

The third method is to use a transformation table. Herein, a table for transformation of weights is created in advance; the closest values to the pre-transformation values are found from the table; and the weights are transformed either into the found values or into the indexes of the found values in the table. As a result, it becomes possible to reduce the number of elements of the set V. In the case of transforming the weights into the indexes in the table, there is a possibility that the apparent order of weights is not preserved. However, the order of weights is preserved in the values indicated by the indexes.

As a result of implementing the third transformation operation, a WFSA can be obtained in which the number of transitions is smaller as compared to the conventional technology in which the transformation operation explained with reference to at Step S101 is not performed. Not only that, it also becomes possible to reduce the memory area required during the deformation operation performed at Step S102. That is achieved because of a decrease in the memory area required to store the weights.

Fourth Transformation Operation

The transforming unit 101 performs constant multiplication of the weights and transforms them into integers or fixed-point numbers having a different expression format than the expression format of the pre-transformation weights. If α represents a constant number, then it serves the purpose as long as α is a real number other than zero. If α is greater than zero but smaller than one, the value becomes closer to zero. Hence, when transformation into integers or fixed-point numbers is performed, the number of elements of the set V decreases. On the other hand, if α is greater than one, when transformation into integers or fixed-point numbers is performed, the number of elements of the set V increases as compared to the case of not performing multiplication for α number of times. Even if α is a negative value, the effect is same. As a result of implementing this method, the accuracy of the weights after the transformation operation at Step S101 and the number of elements of the set V can be controlled according to α. Because of α multiplication, there is a change in the range of values that the weights can take. Hence, the configuration can be such that, after performing the deformation operation at Step S102, the weights are multiplied by 1/α so as to restore the weights in the range of values available at Step S101. Meanwhile, in the case of using a combination with a WFSA generated from a different model, if the weights are used after performing β multiplication, then the configuration can be such that the weights are multiplied by β/α for restoration.

Fifth Transformation Method

In this method, instead of performing 1/α multiplication of the weights after Step S102 as explained in the fourth transformation method, the transforming unit 101 performs 1/α multiplication of the weights at Step S101.

In each example of the transformation operation described above, the operation for transforming floating-point numbers into integers, the operation for transforming floating-point numbers into fixed-point numbers, and the operation for transforming the weights expressed in the double-precision floating point format into the single-precision floating point format are all examples of the operation for transforming the expression format of the post-transformation weights into a different format than the pre-transformation weights.

Given below is further explanation of an example of the deformation operation performed at Step S102. As described above, the deforming unit 102 performs a deformation operation including a determinization operation, a pushing operation, a minimization operation, an ε-removal operation, and a composing operation.

In the determinization operation, a WFSA is deformed in such a way that outgoing transitions from a particular state have mutually different input symbols. In the pushing operation, the weights are shifted. In the minimization operation, a finite state automaton is set by treating an input symbol and the corresponding weight as a single input symbol, and the finite state automaton is minimized. In the ε-removal operation, the transitions not having input symbols assigned thereto are removed. In the composing operation, two WFSTs are composed into a single WFST.

In such deformation operations, the calculation of weights is abstracted using a semiring. The computing for weights includes (+) and (×). Generally, (+) represents a symbol in which + is enclosed in round brackets, and (×) represents a symbol in × is enclosed in round brackets.

For example, in a tropical semiring, (+) represents min, and (×) represents +. That is, 1(+)2=1 and 1(×)2=3 holds true. In a log semiring, $x(+)y=-\log(e^{-x}+e^{-y})$ holds true and (×) represents +. In a probability semiring, (+) represents + and (×) represents ×.

Given below is the explanation of specific examples in which the transformation of weights performed at Step S101 leads to a decrease in the number of transitions at Step S102.

Specific Example 1-1

According to a specific example 1-1, in the transformation operation performed at Step S101, numbers after the decimal point in the floating-point numbers are truncated so as to perform integerization of weights (i.e., the first transformation operation described earlier). The operation at Step S102 represents a determinization operation in which the calculation of weights is performed using the tropical semiring.

Figure 3:
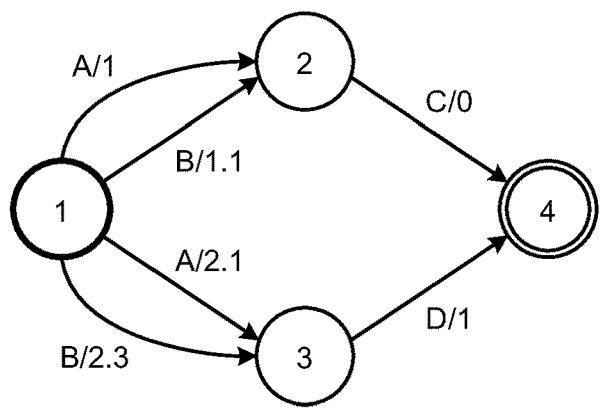
FIG. 3 is a diagram illustrating an example of a pre-operation WFSA.

FIG. 3 is a diagram illustrating a pre-operation WFSA (hereinafter, referred to as A1). Herein, the circles represent the states, and the arrows represent transitions. The heavy-lined circle represents the initial state, and the double circle represents the end state. Moreover, of the labels specified near the arrows, the characters on the left side of "/" represent the input symbols and the characters on the right side of "/" represent the weights.

Figure 4:
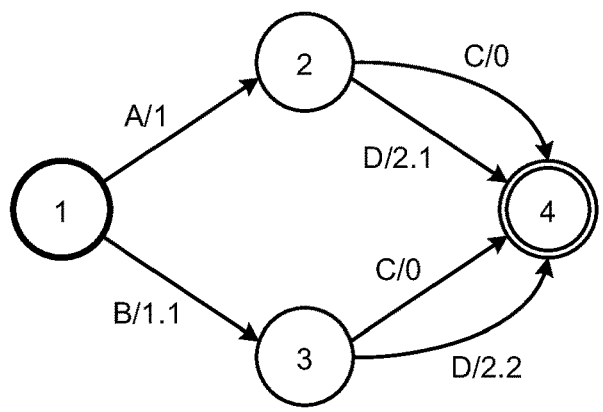
FIG. 4 is a diagram illustrating an example of the result when only a deformation operation is performed.

FIG. 4 is a diagram illustrating the result when the transformation operation at Step S101 is not performed, and only Step S102 (the determinization operation) is carried out. Thus, in FIG. 4 is illustrated the result of determinization of A1.

When the transformation operation at Step S101 is performed on A1 illustrated in FIG. 3 for the purpose of transforming the weights, from among the transitions from a state 1 to a state 2, the transition having B as the input symbol and 1.1 as the weight is transformed to have 1 as the weight. In an identical manner, from among the transitions from the state 1 to a state 3, the transition having A as the input symbol and 2.1 as the weight is transformed to have 2 as the weight. Moreover, from among the transitions from the state 1 to the state 3, the transition having B as the input symbol and 2.3 as the weight is transformed to have 2 as the weight. Prior to the transformation of weights, the set V of weights is equal to {0, 1, 1.1, 2.1, 2.3}. As a result of performing the transformation, the set V' becomes equal to {0, 1, 2}. Thus, there is a decrease in the number of elements of the set V.

Figure 5:
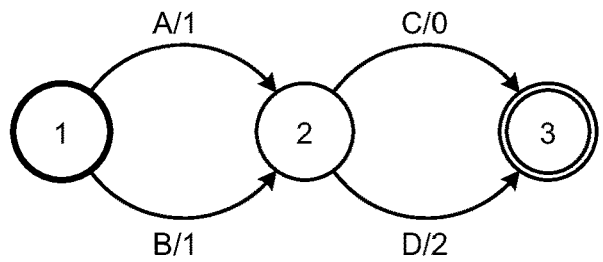
FIG. 5 is a diagram illustrating an example of the result when a deformation operation is performed after performing weight transformation.

FIG. 5 is a diagram illustrating the result of determinization of A1 after performing weight transformation. In FIG. 4, the number of transitions is six. However, in FIG. 5, the number of transitions is four. Thus, it can be seen that the number of transitions has decreased.

As in the case of the specific example 1-1, the transformation operation at Step S101 can be configured according to the method of weight calculation (such as calculation using the tropical semiring) implemented in the deformation operation at Step S102. That is, the transforming unit 101 can perform the transformation operation in such a way that the expression format of the post-transformation weights becomes equal to the expression format determined according to the deformation operation. In the example described above, along with the calculation performed using the tropical semiring, the transformation operation for integerization is carried out. As a result of such a configuration, it is no more required to change the method of weight calculation used in the transformation operation.

Specific Example 1-2

According to a specific example 1-2, the calculation of weights according to the specific example 1-1 is replaced with calculation using the log semiring. In this case, 1(+) 2.1≈0.7127 and 1.1(+)2.3≈0.8367 holds true. Therefore, as a result of determinization obtained without performing the transformation operation at Step S101, the weights illustrated in FIG. 4 change as follows.

the weight of the transition from the state 1 to the state 2: 0.7127 the weight of the transition from the state 1 to the state 3: 0.8367 of the transitions from the state 2 to a state 4, the weight of the transition having C as the input symbol: 0.2873 of the transitions from the state 2 to the state 4, the weight of the transition having D as the input symbol: 2.3873 of the transitions from the state 3 to the state 4, the weight of the transition having C as the input symbol: 0.2633 of the transitions from the state 3 to the state 4, the weight of the transition having D as the input symbol: 2.4633

On the other hand, as a result of determinization obtained after performing the transformation operation at Step S101, the weights illustrated in FIG. 5 change as follows.

the weight of the two transitions from the state 1 to the state 2: (both) 0.6867 of the transitions from the state 2 to the state 3, the weight of the transition having C as the input symbol: 0.3133 of the transitions from the state 2 to the state 3, the weight of the transition having D as the input symbol: 2.3133

In this way, as a result of calculating the weights, although values other than integers are obtained, the number of transitions decreases in an identical manner to the specific example 1-1.

Meanwhile, if the calculation result is held in the form of single-precision floating point numbers, then 32 bits are required to store a single weight. However, if a single weight can be stored as a 16-bit integer value, then it becomes possible to reduce the memory area required to hold the weights. In that regard, in the log semiring, (+) is changed as given below in Equation (1).

$$x(+)y = \text{FLOOR}(-\log_b(b^{-x}+b^{-y})) \qquad (1)$$

Herein, FLOOR represents a function for truncating the numbers after the decimal point; and b represents a positive real number other than one. As a result of making such changes, it becomes possible to reduce the memory area required during the transformation operation performed at Step S102. In this way, the computing used in the deformation operation at Step S102 can be configured in such a way that the expression format of the weights after performing the transformation operation is same as the expression format of the weights obtained during the transformation operation at Step S101. In the case in which the expression format is other than integers, the FLOOR function can be substituted with an arbitrary CONV function for transformation into a predetermined expression format.

Specific Example 1-3

According to a specific example 1-3, the configuration is done to implement the fifth transformation operation at Step S101. More particularly, during the transformation operation at Step S101, some of the integer values are combined so as to reduce the number of elements of the set V. Herein, it is assumed that the deformation operation at Step S102 includes the pushing operation followed by the automaton minimization operation. Moreover, during the pushing operation, the calculation of weights is done using the tropical semiring. In this example, during the transformation operation performed on the weights at Step S101, a method is implemented in which calculation for the transformation of weights is performed with α=2, that is, with FLOOR(x/2)×2. Herein, x represents a weight.

Figure 6:
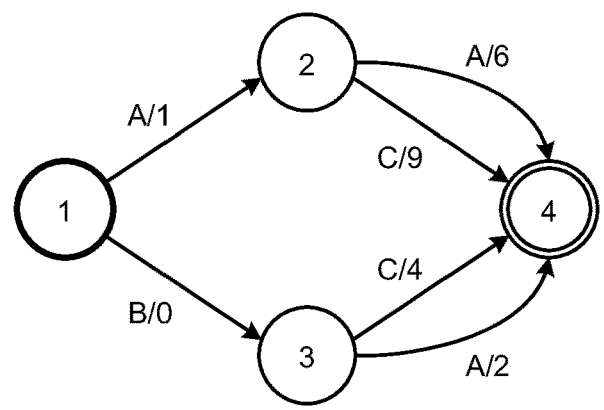
FIG. 6 is a diagram illustrating an example of a pre-operation WFSA.
Figure 7:
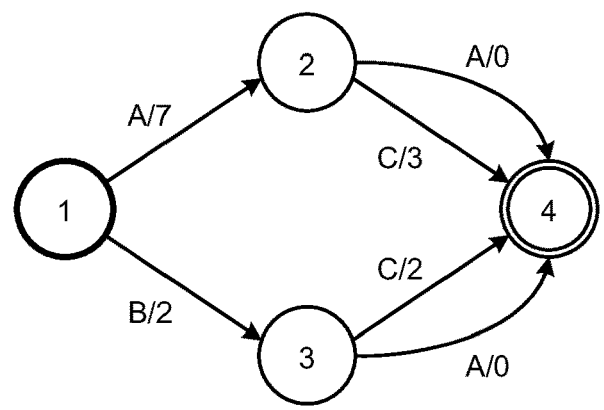
FIG. 7 is a diagram illustrating an example of the result when only a deformation operation is performed.

In FIG. 6 is illustrated a pre-operation WFSA used in this example (hereinafter, referred to as A2). FIG. 7 is a diagram illustrating the result obtained when only the deformation operation at Step S102 is performed (i.e. when the pushing operation is performed, followed by the automaton minimization operation in which a set of an input symbol and the corresponding weight is treated as an input symbol).

When the weight transformation at Step S101 is performed on A2 illustrated in FIG. 6; then, from among the transitions from the state 2 to the state 4 illustrated in FIG. 6, the weight of the transition having C as the input symbol changes from nine to eight. Moreover, the weight of the transition from the state 1 to the state 2 changes from one to zero. All other weights remain the same.

Figure 8:
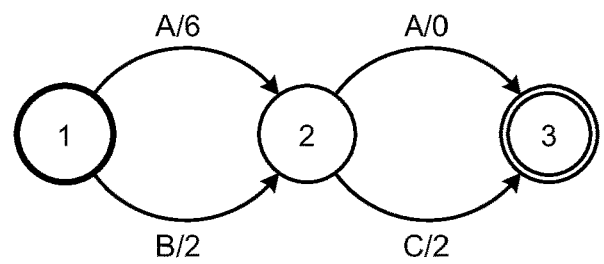
FIG. 8 is a diagram illustrating an example of the result when a deformation operation is performed after performing weight transformation.

FIG. 8 is a diagram illustrating the result of performing the deformation operation at Step S102 on A2 in which the weight transformation has been performed. It can be seen that the number of transitions has decreased from six to four. Meanwhile, alternatively, the configuration can be such that, instead of combining integers, some of the floating-point numbers are combined or some of the fixed-point numbers are combined.

In this example, in the automaton minimization operation from among the operations performed at Step S102, the input symbol and the weight assigned to each transition of a WFSA are treated as a single input symbol. For that reason, although a transition itself is deleted or the connection-destination state of a transition changes, the weights assigned to the transitions do not undergo any change.

In contrast, in the pushing operation, the weights assigned to the transitions undergo changes. Similarly, in the determinization operation explained in the specific example 1-1, the weights undergo changes. As a result of the deformation operation performed on a WFSA at Step S102, sometimes the states joined by the transitions having changed weights also undergo changes. In that case, if the weight of a particular pre-deformation transition is different than the weight of the corresponding post-deformation transition, it is possible to think that the weight of the concerned transition has been changed. Thus, the step of changing the weights is included in the deformation operation performed on a WFSA.

In the pushing operation that is one of the deformation operations performed on a WFSA, although the connections of the transitions are not changed, the step of changing the weights is included. The post-deformation transition corresponding to a particular pre-deformation state differs depending on the contents of the deformation operation.

When the deformation operation represents the determinization operation, the last transition in the path starting from the pre-deformation initial state corresponding to a particular input symbol string x corresponds to the last transition in the path starting from the post-deformation initial state corresponding to the input symbol string x.

Consider a case when the deformation operation represents the ε-removal operation. As a result of performing the deformation operation, regarding a state q' that can be reached from a particular pre-deformation state q only by ε transitions, an outgoing transition e from the state q' is changed to an outgoing transition e' from the state q. At that time, the transition e corresponds to the transition e'. Unless the combined value of the weights of the transitions constituting the path including only ε transitions between the states q and q' is not equal to zero, the values of the weights of the transitions e and e' are different. That is, the weights are changed. Herein, an transition points to a transition in which the input symbol is ε representing emptiness.

Specific Example 1-4

According to a specific example 1-4, the operation at Step S102 has increased processing details. In this example, a WFST (hereinafter, referred to as G) is used that represents a language model indicating the association of words, and a WFST (hereinafter, referred to as L) is used that represents the arrangement of phonemes of words.

Firstly, the transformation operation at Step S101 is performed on G. The post-transformation-operation G is referred to as G'. At Step S102, a composing operation is performed to compose L and G'; and then the determinization operation, the pushing operation, and the minimization operation are performed in that order. After the minimization operation is performed, the ε-removal operation can be additionally performed. The determinization operation explained in the specific example 1-1 and the pushing operation and the minimization operation explained in the specific example 1-3 are included at Step S102. For that reason, as compared to the case in which Step S101 is skipped, the WFSA obtained after performing the operation at Step S102 has a decreased number of transitions.

Figure 9:
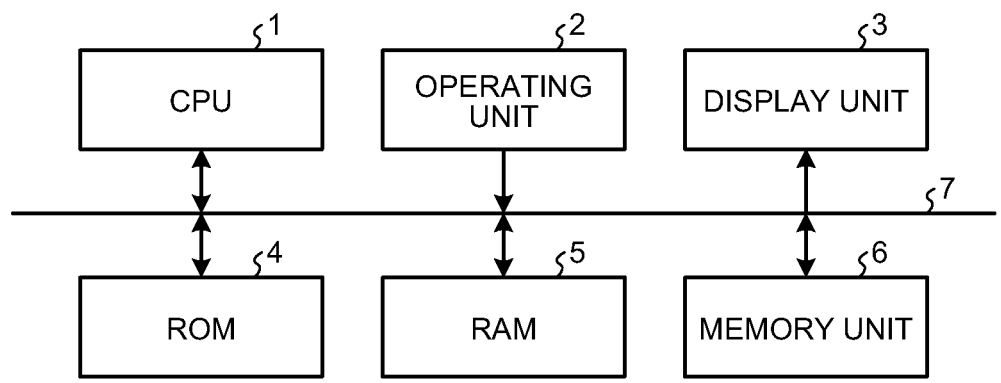
FIG. 9 is a hardware diagram of the automaton deforming device according to the first embodiment.

Explained below with reference to FIG. 9 is a hardware configuration of the automaton deforming device 100 according to the first embodiment. FIG. 9 is an explanatory diagram illustrating an exemplary hardware configuration of the automaton deforming device 100 according to the first embodiment.

As illustrated in FIG. 9, the automaton deforming device 100 includes a central processing unit (CPU) 1, an operating unit 2, a display unit 3, a read only memory (ROM) 4, a random access memory (RAM) 5, a memory unit 6, and a bus 7. All constituent elements are interconnected via the bus 7.

The CPU 1 uses a predetermined area of the RAM 5 as the work area; performs various operations in cooperation with various computer programs stored in advance in the ROM 4 or the memory unit 6; and comprehensively controls the operations of the constituent elements of the automaton deforming device 100. Moreover, the CPU 1 implements the functions of the abovementioned functional units in cooperation with predetermined computer programs stored in advance in the ROM 4 or the memory unit 6.

The operating unit 2 is an input device such as a mouse or a keyboard that receives an instruction signal representing the information input by the user and then outputs the instruction signal to the CPU 1.

The display unit 3 is configured with a display device such as a liquid crystal display (LCD), and displays a variety of information based on display signals received from the CPU 1.

The ROM 4 is used to store, in a non-rewritable manner, computer programs and a variety of information related to the control of the automaton deforming device 100.

The RAM 5 is a volatile memory medium such as an SDRAM (which stands for Synchronous Dynamic Random Access Memory), and serves as the work area of the CPU 1. More particularly, the RAM 5 assumes the role of a buffer for temporarily storing various variables and parameter values generated during the deformation operation that is performed on a WFSA.

The memory unit 6 includes a semiconductor memory medium such as a flash memory or includes a memory medium in which information can be recorded in a magnetic or optical manner; and is used to store, in a rewritable manner, computer programs and a variety of information related to the control of the automaton deforming device 100. The memory unit 6 is used to store in advance a variety of information related to a WFSA and to store an appearance-position-appended WFSA representing the processing result of the deformation operation performed on the WFSA.

The computer programs executed in the automaton deforming device according to the first embodiment are stored in advance in the ROM 4.

Alternatively, the computer programs executed in the automaton deforming device according to the first embodiment can be recorded as installable or executable files in a computer-readable memory medium such as a compact disk read only memory (CD-ROM), a flexible disk (FD), a compact disk recordable (CD-R), or a digital versatile disk (DVD); and can be provided as a computer program product.

Still alternatively, the computer programs executed in the automaton deforming device according to the first embodiment can be saved as downloadable files on a computer connected to the Internet or can be made available for distribution through a network such as the Internet.

The computer programs executed in the automaton deforming device according to the first embodiment can make a computer function as the constituent elements of the automaton deforming device. In the computer, the CPU 1 reads the computer programs from a computer-readable memory medium, loads them in a main memory device, and executes them.

In this way, in the automaton deforming device according to the first embodiment, it becomes possible to obtain a weighted finite state automaton having a smaller number of transitions than in the case of using the conventional technology.

Second Embodiment

There are times when a model that is to be preferably treated as a WFSA is not expressed in the WFSA format. In that case, the model needs to be transformed into a WFSA. At that time, after transforming the model into a WFSA, the weight transformation can be performed as explained in the first embodiment. However, alternatively, it is also possible to think of a method in which the values representing the post-transformation weights of the WFSA are transformed at the stage of the model. In the automaton deforming device according to the second embodiment, the weights are transformed at the stage of the model.

Figure 10:
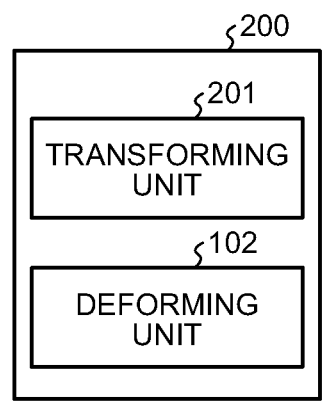
FIG. 10 is block diagram illustrating an automaton deforming device according to a second embodiment.

FIG. 10 is a block diagram illustrating an exemplary configuration of an automaton deforming device 200 according to the second embodiment. As illustrated in FIG. 10, the automaton deforming device 200 includes a transforming unit 201 and the deforming unit 102. Herein, the deforming unit 102 has identical functions to the functions explained in the second embodiment. Hence, the same reference numeral is used, and the explanation is not repeated.

The transforming unit 201 does not transform the weights assigned to the transitions in a WFSA. Instead, the transforming unit 201 transforms the values (example of first values) that are set in a model and that, during the transformation of the model to a WFSA, are transformed into the weights assigned to the transitions in the WFSA. The transforming unit 201 generates the post-transformation values (example of second values) in such a way that there is a decrease in the number of elements of the set of such values and that the order of values is preserved.

Moreover, the transforming unit 201 has the function of transforming the model, from which the values have been transformed, into a WFSA. During the transformation from the model into a WFSA, values (example of third values) according to the post-transformation values (example of second values) are assigned as the weights of the WFSA.

Figure 11:
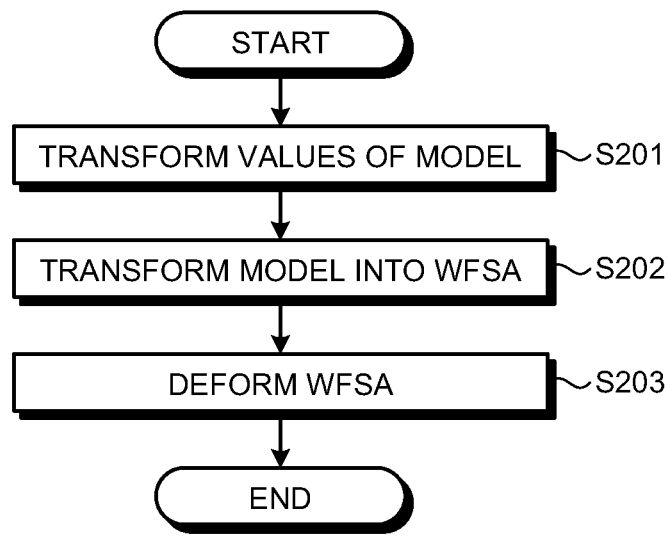
FIG. 11 is a flowchart for explaining an automaton deformation operation according to the second embodiment.

Explained below with reference to FIG. 11 is the automaton deformation operation performed in the automaton deforming device 200 configured in the manner described above according to the second embodiment. FIG. 11 is a flowchart for explaining an example of the automaton deformation operation according to the second embodiment.

The transforming unit 201 transforms the values that are set in the model and that serve as the weights of a WFSA obtained by performing the transformation operation (Step S202) for transforming the model into a WFSA (Step S201).

Then, the transforming unit 201 transforms the model, from which the values have been transformed, into a WFSA (Step S202). The subsequent operation at Step S203 is identical to the operation performed at Step S102 in the automaton deforming device 100 according to the first embodiment. Hence, that explanation is not repeated.

Given below is the explanation of specific examples of the automaton deformation operation according to the second embodiment.

Specific Example 2-1

In a specific example 2-1, the explanation is given for a case in which the model is an N-gram language model. For the sake of illustration, the N-gram language model is assumed to be a bi-gram language model. However, even if N of the N-gram is other than two, the explanation is applicable in an identical manner. Herein, if $P(w2|w1)$ represents the probability of occurrence of a word $w2$ subsequent to a word $w1$, then it is assumed that the value assigned as the weight of a WFSA at Step S202 is $-\log(P(w2|w1))$.

At Step S201, the values set in the model are transformed in such a way that there is a decrease in the number of elements of the set V of values. In that regard, it is possible to implement identical methods to the first to fifth transformation operations implemented by the transforming unit 101 according to the first embodiment.

In the transformation operation performed at Step S201, a real number is transformed into a fixed-point number, which has the number of valid decimal places equal to one, using rounding off. If a value set in the model is $-\log(P(w2|w1))=0.11$, that value is transformed into 0.1. If a value set in the model is $-\log(P(w2|w1))=1.37$, that value is transformed into 1.4. Each post-transformation value is assigned as a weight of the WFSA at Step S202. Depending on the application, it is also possible to think of not taking the logarithm and assigning the probabilities of appearance without modification as the weights of the WFSA. In that case, the transformation operation at Step S201 can be performed directly on the probabilities of appearance.

Specific Example 2-2

In a specific example 2-2, the explanation is given for a case in which the model is a hidden Markov model (HMM). In the case of transforming an HMM into a WFSA, the transition probabilities of the HMM can be assigned as the weights of the WFSA. Thus, the transformation of values performed at Step S201 is done with respect to the transition probabilities of the HMM. In the same manner as the case of an N-gram language model, the transformation operation at Step S201 can be performed on logarithmic values, and the values obtained as a result of the transformation operation can be assigned as the weights.

Specific Example 2-3

In a specific example 2-3, the explanation is given for an example in which the model is a pronunciation model of words. For example, regarding the word "water", there are three types of pronunciations according to the dictionary. Hence, for each pronunciation, a value corresponding to the degree of ease in making the pronunciation can be assigned. That value is then transformed at Step S202 so that it can be assigned as a weight in the WFSA. In this case, the transformation at Step S201 is performed on the degree of ease in making the pronunciation.

Specific Example 2-4

In a specific example 2-4, the explanation is given for an example in which the model represents deformation of the pronunciations (a pronunciation deformation model). For example, in the specific example 2-3, it is mentioned that there are three types of pronunciation of the word "water". However, it is possible to think of a model for deforming one of those three pronunciations into a different pronunciation. This model can include a value representing the degree of ease in performing deformation. Then, at Step S202, the transformation is performed so that the value is assigned as a weight of the WFSA. In this case, the transformation at Step S201 is performed on the value representing the degree of ease in performing deformation.

Specific Example 2-5

In OCR or handwritten-character recognition, there are times when portions constituting characters are recognized and, of the characters obtained by combining the recognized portions, the character having the highest likelihood is selected. Herein, a model representing the likelihoods of such combinations is called a character model. In a specific example 2-5, the explanation is given for a case in which the character model is to be preferably treated as a WFSA. The likelihood of a combination of portions that constitute characters is expressed as a numerical value. Then, at Step S202, the transformation is performed in such a way that the numerical value is assigned as a weight of the WFSA. In this case, the transformation of the value performed at Step S201 is performed on the numerical value expressing the likelihood.

In this way, in the automaton deforming device according to the second embodiment, it becomes possible to obtain a weighted finite state automaton having a smaller number of transitions than in the case of using the conventional technology.

Third Embodiment

In an automaton deforming device according to a third embodiment, after performing the automaton deformation operation according to the first embodiment (for example, after performing Steps S101 and S102 illustrated in FIG. 2), an operation is added in which the format of the weights is again transformed and moreover the values of the weights of the WFSA are changed. As a result of changing the values of the weights, a plurality of paths having the same weight due to the operation at Step S101 can be changed to the paths having different weights.

Figure 12:
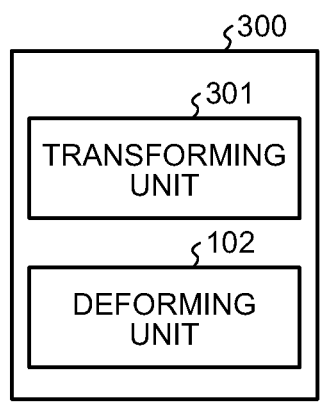
FIG. 12 is block diagram illustrating an automaton deforming device according to a third embodiment.

FIG. 12 is a block diagram illustrating an exemplary configuration of an automaton deforming device 300 according to the third embodiment. As illustrated in FIG. 12, the automaton deforming device 300 includes a transforming unit 301 and the deforming unit 102. Herein, the deforming unit 102 has identical functions to the functions explained in the second embodiment. Hence, the same reference numeral is used, and the explanation is not repeated.

As compared to the transforming unit 101 according to the first embodiment, the transforming unit 301 differs in the way of additionally having the function of transforming the expression format of the weights of a WFSA and the function of adding a slight variation to the values of the weights obtained after the transformation of the expression format. Herein, a slight variation indicates that the difference between the pre-correction value and the post-correction value is within a permissible value. As far as the permissible value is concerned, for example, a value is used that enables preserving the order of values even after the variation.

Figure 13:
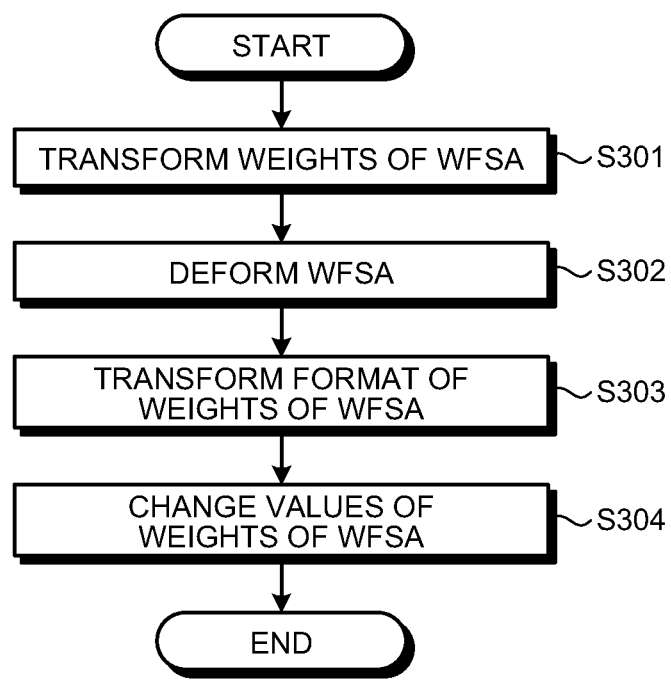
FIG. 13 is a flowchart for explaining an automaton deformation operation according to the third embodiment.

Explained below with reference to FIG. 13 is an automaton deformation operation performed in the automaton deforming device 300 configured in the manner described above according to the third embodiment. FIG. 13 is a flowchart for explaining an example of the automaton deformation operation according to the third embodiment.

The operations performed at Steps S301 and S302 are respectively identical to the operations performed at Steps S101 and S102 according to the first embodiment. Hence, that explanation is not repeated.

The transforming unit 301 transforms the expression format of the weights of the WFSA that has been deformed at Step S302 (Step S303). For example, after performing the operation at Step S301, if the expression format of the weights is the integer format, the transforming unit 301 transforms the integer format into the floating-point format. At Step S303, the transforming unit 301 may perform transformation into the same format as the format prior to the transformation at Step S301 or may perform transformation into a different format. However, the format must be able to reflect the processing result at Step S304 given below.

Then, the transforming unit 301 adds a slight variation to the post-format-transformation weights of the WFSA (Step S304). As a result, it becomes possible to reduce the number of paths having the same weight.

Regarding making changes to ensure that the paths have different weights, the advantage can be understood by thinking about, for example, the problem of performing an operation in which, from among the paths from the initial state to the final state of the WFSA, the input symbol string of the path having the smallest weight is obtained.

For example, assume that, prior to the operation performed at Step S301, a path n1 having the smallest weight is uniquely determined and hence the input symbol string is also uniquely determined. Moreover, it is assumed that there are one or more paths having the weights close to the weight of the path n1, and one of such paths is a path n2. Prior to performing the operation at Step S301, the paths n1 and n2 have different weights. However, if the difference between those weights is small enough as far as the operation at Step S301 is concerned, performing the operation at Step S301 results in having the same weight for the paths n1 and n2.

As a result, there happen to be two paths n1 and n2 having the smallest weight. That is, although, prior to the operation at Step S301, the input symbol string of the path having the smallest weight was uniquely determined; a plurality of input symbol strings appear in a corresponding manner to the paths having the smallest weight.

It implies that the resultant input symbol string needs to be selected according to a method other than the method of using the weights. According to the third embodiment, in most cases, this issue is resolved by performing the operations at Steps S303 and S304.

Meanwhile, the fourth transformation operation explained in the first embodiment can also be implemented in the third embodiment. In that case, in an identical manner to the first embodiment, the operation of 1/α multiplication of the weights can be performed immediately after Step S302 or after Step S303.

Regarding the problem mentioned above, the detailed explanation is given below with reference to FIG. 3. In FIG. 3, there are four possible paths as given below. Moreover, AC represents the input symbol string of the path having the smallest weight.

(P1-1) input symbol string: AC, weight: 1
(P1-2) input symbol string: BC, weight: 1.1
(P1-3) input symbol string: AD, weight: 3.1
(P1-4) input symbol string: BD, weight: 3.3

Meanwhile, the WFSA illustrated in FIG. 5 is equivalent to the result of processing the WFSA illustrated in FIG. 3 by performing the operations at Steps S301 and S302. In the WFSA illustrated in FIG. 5, there are four paths as given below.

(P2-1) input symbol string: AC, weight: 1
(P2-2) input symbol string: BC, weight: 1
(P2-3) input symbol string: AD, weight: 3
(P2-4) input symbol string: BD, weight: 3

In this way, if the operations at Steps S301 and S302 are performed, the input symbol string of the path having the smallest weight is either AC or BC. That is, the path having the smallest weight is not uniquely determined.

In that regard, in the third embodiment, the transforming unit 301 adds a slight variation to the weights of the WFSA so as to reduce the number of paths having the same weight. Given below is the explanation of specific examples of the operation of adding a slight variation to the weights.

Specific Example 3-1

In a specific example 3-1, a random variation is added to the weights. Regarding each transition e included in a WFSA, the transforming unit 301 substitutes the weight $w(e)$ of the transition e with a weight $w(e)+random(\delta)$. Herein, $\delta$ is a very small value equivalent to the permissible value mentioned above. For example, $\delta$ is assumed to be a value sufficiently close to zero as compared to the weights assigned to the transitions. Moreover, $random(\delta)$ is assumed to be a function that generates, for each transition, a random value within the range of $[-\delta, +\delta]$.

Specific Example 3-2

In a specific example 3-2, a variation to the weights is added based on the input symbols of the transitions in a WFSA. The input symbols can be associated to numbers. Thus, the transforming unit 301 determines variation values in descending order or ascending order of those numbers and adds the values to the weights associated to the input symbols. For example, when the input symbols are expressed as lower-case alphabets a to z, the transforming unit 301 determines variation values as follows: $a=13\delta$, $b=12\delta$, $c=11\delta$, ..., $m=\delta$, $n=-\delta$, $o=-2\delta$, $x=-11\delta$, $y=-12\delta$, and $z=-13\delta$. Herein, for example, "$a=13\delta$" implies that a variation value "$13\delta$" is decided for the input symbol "a".

Specific Example 3-3

In a specific example 3-3, the method is based on the model that is yet to be transformed into a WFSA. Herein, although the explanation is given for an example in which the N-gram language model is used, the same operations can be performed on the model explained in the second embodiment or any other model. Herein, consider the case when the N-gram language model is a bi-gram language model. When $P(w2|w1)$ represents the probability of occurrence of the word w2 subsequent to the word w1, the transforming unit 301 adds $-\delta \log(P(w2|w1))$ to the weight of the transition e to which the word w2 is assigned as the input symbol. The word w1 is the last word of the input symbol string of the path that reaches the transition e. If there is a plurality of words serving as w1, then the average value of the respective probabilities of appearance can be treated as $P(w2|w1)$, and the variation value can be accordingly calculated. Alternatively, a unigram $P(w2)$ can be used in place of $P(w2|w1)$. Also when N of the N-gram is equal to or greater than three, if the N−1-th word from the end of the input symbol string of the path reaching the transition e is used, the operations can be performed in an identical manner to the case of using a gram.

In order to determine the value δ that is very small, it is possible to think of various methods as follows.

First determination method: A method in which, from among the weights of the transitions in a WFSA, a value smaller than the value closest to zero other than zero is set as δ.

Second determination method: A method in which the difference value between each set of two weights of the transitions in a WFSA are calculated and, from among the difference values, the value closest to zero other than zero is set as δ.

Third determination method: A method in which, for each transition, difference values between the weights before and after performing the operation at Step S301 is calculated; and, from the difference values, the value closest to zero other than zero is set as δ. Herein, in order to ensure that the value of δ is positive, the modulus can be taken and moreover be multiplied with a predetermined fixed value.

Fourth determination method: The value of δ obtained according to the first to third determination methods is divided by a value based on the number of transitions, and the division result is set as δ. The value based on the number of transitions is, for example, the total number of transitions. Alternatively, as the value based on the number of transitions, it is possible to use the number of transitions in the path having the lowest number of transitions from among the paths starting from the initial state to the end state. Still alternatively, if there is no cyclic path in the WFSA, then the number of transitions in the path having the highest number of transitions from among the paths starting from the initial state to the end state can be used as the value based on the number of transitions.

The value of δ can be set to a still smaller value as long as it is within the range of being expressible in the expression format of the weights after performing the operation at Step S303. Alternatively, the value of δ can be set to a still greater value.

In this way, in the automaton deforming device according to the third embodiment, regarding a plurality of paths that have the same weight as a result of performing transformation of weights, the weight is changed to different weights thereby achieving reduction in the number of paths having the same weight. That eliminates the need of performing the operation for determining the resultant path from among the paths having the same weight.

Field of Application of Embodiments

The methods explained above can be used in various fields in which a WFSA is used.

In the case of speech recognition; the HMM, the pronunciation dictionary of words, and the language model are expressed as WFSTs. Such WFSTs are optimized by performing the composing operation, the determinization operation, and the minimization operation mentioned at Step S102. If the operation at Step S101 is performed before or during the abovementioned sequence of operations, it becomes possible to achieve the effect according to the first embodiment. At the time of transforming the HMM, the pronunciation dictionary of words, and the language model into WFSTs; if the operations at Steps S201 and S202 are performed, it becomes possible to achieve the effect according to the second embodiment.

Regarding series data recognition such as OCR, handwritten-character recognition, and gesture recognition too; in the case of implementing a method in which a WFST is used, it becomes possible to achieve the effect according to the first embodiment or the second embodiment in an identical manner to the case of speech recognition.

Other than that, if a method in which a WFST is used is implemented in statistical machine translation, text summarization, and tagging of text (for example, part of speech); it becomes possible to achieve the effect according to the first embodiment or the second embodiment.

As described above, according to the first to third embodiments, it becomes possible to obtain a weighted finite state automaton having a smaller number of transitions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An automaton deforming device comprising:
one or more hardware processors electrically coupled to a memory, and configured to:
generate, before deforming a weighted finite state automaton that is generated based on a language model in which probabilities of appearance of words are set, second values by transforming first values, which either represent weights assigned to transitions in the weighted finite state automaton or represent values that are transformed into weights assigned to the transitions in the weighted finite state automaton, in such a way that number of elements of a set of the first values are reduced and an order of the first values is preserved;
deform the weighted finite state automaton in which weights according to the second values are assigned to the transitions;
transform expression format of the weights that are assigned to the transitions in the weighted finite state automaton which has been deformed; and
correct one or more weights, from among weights subjected to transformation of the expression format, to values that are based on probabilities of appearance of words assigned to corresponding transitions and that differ from post-correction values within a permissible value.

2. The device according to claim 1, wherein
the first values represent the weights assigned to the transitions in the weighted finite state automaton, and
the one or more hardware processors deforms the weighted finite state automaton in which the second values are assigned as the weights to the transitions.

3. The device according to claim 1, wherein
the first values represent values that are set in a model which is to be transformed into the weighted finite state automaton and that represent values assigned as the weights to the transitions in the weighted finite state automaton at time of transforming the model into the weighted finite state automaton,
the one or more hardware processors transforms the model, in which the second values obtained from transforming the first values are set, into the weighted finite state automaton in which third values according to the second values are assigned as the weights to the transitions, and
the one or more hardware processors deforms the weighted finite state automaton in which the third values are assigned as the weights to the transitions.

4. The device according to claim 3, wherein the model is either one of a language model, a pronunciation model, a pronunciation deformation model, a character model, and a hidden Markov model.

5. The device according to claim 1, wherein expression format of the second values is different from expression format of the first values.

6. The device according to claim 5, wherein expression format of the second values is determined according to a deformation operation performed by the one or more hardware processors.

7. The device according to claim 5, wherein the one or more hardware processors deforms the weighted finite state automaton in such a way that expression format of post-deformation weights is same as expression format of the second values.

8. The device according to claim 5, wherein the one or more hardware processors deforms the weighted finite state automaton by performing a deformation operation including $CONV(-\log_b(b^{-x}+b^{-y}))$,
where x and y represent the weights, b represents a positive real number other than one, and CONV represents a function for transforming the weights of the transitions into a predetermined expression format.

9. The device according to claim 5, wherein number of bits expressing the second values is smaller than number of bits expressing the first values.

10. The device according to claim 5, wherein
the expression format of the first values is floating-point format, and
the expression format of the second values is integer format.

11. The device according to claim 5, wherein
the expression format of the first values is floating-point format, and
the expression format of the second values is fixed-point format.

12. The device according to claim 5, wherein the one or more hardware processors performs constant multiplication of the first values and then transforms the first values into the second values having a different expression format.

13. The device according to claim 1, wherein the one or more hardware processors corrects one or more weights, from among weights subjected to transformation of the expression format, to randomly-selected values in such a way that the difference with the post-correction values is within the permissible value.

14. The device according to claim 1, wherein the one or more hardware processors deforms the weighted finite state automaton, in which the weights according to the second values are assigned to the transitions, by performing a deformation operation including an operation of changing weight assigned to at least a single transition.

15. The device according to claim 1, wherein the one or more hardware processors deforms the weighted finite state automaton, in which the weights according to the second values are assigned to the transitions, by performing a deformation operation including one of a determinization operation, a pushing operation, a composing operation, and an ε-removal operation.

16. The device according to claim 15, wherein the one or more hardware processors performs the determinization operation, the pushing operation, and a minimization operation in this order on the weighted finite state automaton that is obtained by performing the composing operation for composing a plurality of weighted finite state automatons in which weights according to the second values are assigned to the transitions.

17. An automaton deforming method comprising:
generating, before deforming a weighted finite state automaton that is generated based on a language model in which probabilities of appearance of words are set, second values by transforming first values, which either represent weights assigned to transitions in the weighted finite state automaton or represent values that are transformed into weights assigned to the transitions in the weighted finite state automaton, in such a way that number of elements of a set of the first values are reduced and an order of the first values is preserved;
deforming the weighted finite state automaton in which weights according to the second values are assigned to the transitions;
transforming expression format of the weights that are assigned to the transitions in the weighted finite state automaton which has been deformed; and
correcting one or more weights, from among weights subjected to transformation of the expression format, to values that are based on probabilities of appearance of words assigned to corresponding transitions and that differ from post-correction values within a permissible value.

18. A computer program product comprising a non-transitory computer-readable medium including programmed instructions, wherein the instructions, when executed by a computer, cause the computer to perform:
generating, before deforming a weighted finite state automaton that is generated based on a language model in which probabilities of appearance of words are set, second values by transforming first values, which either represent weights assigned to transitions in the weighted finite state automaton or represent values that are transformed into weights assigned to the transitions in the weighted finite state automaton, in such a way that number of elements of a set of the first values are reduced and an order of the first values is preserved;
deforming the weighted finite state automaton in which weights according to the second values are assigned to the transitions;
transforming expression format of the weights that are assigned to the transitions in the weighted finite state automaton which has been deformed; and
correcting one or more weights, from among weights subjected to transformation of the expression format, to values that are based on probabilities of appearance of words assigned to corresponding transitions and that differ from post-correction values within a permissible value.

* * * * *